US010241781B2

United States Patent
Smith

(10) Patent No.: US 10,241,781 B2
(45) Date of Patent: *Mar. 26, 2019

(54) SYSTEMS AND METHODS FOR MANAGING COMPUTER COMPONENTS

(71) Applicant: MASTERCARD INTERNATIONAL INCORPORATED, Purchase, NY (US)

(72) Inventor: Jeffrey Scott Smith, Fenton, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,140

(22) Filed: Mar. 9, 2018

(65) Prior Publication Data

US 2018/0196663 A1 Jul. 12, 2018

Related U.S. Application Data

(63) Continuation of application No. 14/965,407, filed on Dec. 10, 2015, now Pat. No. 9,916,152.

(51) Int. Cl.
G06F 8/65 (2018.01)
G06Q 10/00 (2012.01)

(52) U.S. Cl.
CPC ............... *G06F 8/65* (2013.01); *G06Q 10/20* (2013.01)

(58) Field of Classification Search
None
See application file for complete search history.

(56) References Cited

U.S. PATENT DOCUMENTS 5,974,454 A * 10/1999 Apfel .................. G06F 8/65
709/218
6,023,699 A * 2/2000 Knoblock ............ G06Q 10/06
(Continued)

FOREIGN PATENT DOCUMENTS

WO 2015015567 A1 2/2015
WO 2015179695 A1 11/2015

OTHER PUBLICATIONS

PCT International Search Report and Written Opinion of International Application No. PCT/US2016/062701, dated Feb. 10, 2017, 10 pages.

(Continued)

*Primary Examiner* — Hossain M Morshed
(74) *Attorney, Agent, or Firm* — Armstrong Teasdale LLP

(57) ABSTRACT

A computer-based method for managing a plurality of computer components in an organization is provided. The method is implemented using a Component Manager (CM) computing device. The method includes receiving, from a stakeholder computing device, component data for at least one computer component of the plurality of computer components. The method also includes storing the component data in a memory block in the memory device. The method further includes assigning a first lifecycle classification, a domain, and at least one stakeholder to the at least one computer component by updating the memory block in the memory device. The method also includes causing the stakeholder computing device to electronically display an interactive dashboard that includes a graphical representation of the at least one computer component. The method further includes prompting a stakeholder to update a component utilization scheme for the computer component, by electronically displaying the graphical representation.

20 Claims, 7 Drawing Sheets

(56) References Cited

U.S. PATENT DOCUMENTS

| | | | | |
|---|---|---|---|---|
| 6,098,050 A * | 8/2000 | Knoblock | ............ | G06Q 10/087 |
| | | | | 705/28 |
| 7,048,185 B2 * | 5/2006 | Hart | ............ | G06Q 10/06 |
| | | | | 235/384 |
| 7,058,154 B1 * | 6/2006 | Stark | ............ | G06Q 10/06 |
| | | | | 228/102 |
| 7,310,801 B2 * | 12/2007 | Burkhardt | ............ | G06F 8/65 |
| | | | | 717/169 |
| 8,145,545 B2 | 3/2012 | Rathod | | |
| 8,713,525 B2 * | 4/2014 | Attalla | ............ | G06F 8/65 |
| | | | | 705/26.35 |
| 9,891,907 B2 * | 2/2018 | Searle | ............ | H04L 41/082 |
| 2002/0013837 A1 * | 1/2002 | Battat | ............ | G06F 3/0481 |
| | | | | 709/223 |
| 2006/0224472 A1 * | 10/2006 | May | ............ | G06Q 10/087 |
| | | | | 705/28 |
| 2006/0293942 A1 * | 12/2006 | Chaddha | ............ | G06Q 10/06 |
| | | | | 705/7.12 |
| 2008/0086345 A1 * | 4/2008 | Wilson | ............ | G06F 17/3089 |
| | | | | 705/7.11 |
| 2009/0031286 A1 * | 1/2009 | Yee | ............ | G06Q 10/06 |
| | | | | 717/120 |
| 2012/0304248 A1 * | 11/2012 | Watts | ............ | G06Q 30/06 |
| | | | | 726/1 |
| 2014/0288996 A1 * | 9/2014 | Rence | ............ | G06Q 10/0635 |
| | | | | 705/7.28 |
| 2015/0088834 A1 * | 3/2015 | Wright, Sr. | ............ | G06F 17/30377 |
| | | | | 707/689 |
| 2015/0350361 A1 * | 12/2015 | Bektas | ............ | H04L 67/2833 |
| | | | | 709/205 |
| 2016/0294614 A1 * | 10/2016 | Searle | ............ | G06F 8/654 |
| 2018/0196663 A1 * | 7/2018 | Smith | ............ | G06F 8/65 |

OTHER PUBLICATIONS

Smith, "Software Component Management Best Practices—SWM 7.0", Nov. 2010, Located at: https://www.symantec.com/articles/software-component-management-best-practices-swm-70.

Rubino, "How to schedule Windows update installations in Windows 10 Pro", Aug. 22, 2015.

* cited by examiner

SYSTEMS AND METHODS FOR MANAGING COMPUTER COMPONENTS

CROSS REFERENCE TO RELATED APPLICATIONS

This application is a continuation application of U.S. patent application Ser. No. 14/965,407, filed Dec. 10, 2015, entitled "SYSTEMS AND METHODS FOR MANAGING COMPUTER COMPONENTS", the disclosure of which is hereby incorporated by reference in its entirety.

BACKGROUND

This disclosure relates generally to the field of information technology, and more specifically to network-based systems and methods for managing software and hardware components through a lifecycle of these components.

As a matter of background, information technology components may include at least software components and hardware components. A software component is a collection of computer-executable instructions that cause a computer processor to perform specific functions required by, for example, a department of a company. Software component functions include processing, testing, reporting, graphic design, or the like. A software component may be commercially available off the shelf and available for sale, lease or license for the general public, or it may be open source software or freeware. Maintenance of the software component may also be available to purchase from the software vendor. Alternatively, the software component may be developed internally by a company and/or may be a competitor to a commercially available software product. Hardware components include physical devices that are part of a computer system.

Large organizations, especially those heavily reliant on computer technology, employ a massive number of diverse software and hardware components (also referred to herein as "computer components" or "components") in their day-to-day operations. A large multinational business entity, for example, may have thousands of computer components in use. Components may be specific to geographical region, department, or even team. Components are acquired from many disparate sources and at different points in the life of the organization, as well as the maturity of the component itself. Accordingly, in many organizations, it becomes difficult or impossible to track all computer components in use. Moreover, it is tedious to repeatedly survey each department regarding computer components in use within the department. There may be no single component repository where computer components are inventoried, managed, and maintained through their respective lifecycles. Component users in one organizational department are frequently unaware of components in use in other departments, and these users may mistakenly purchase redundant components for a solution when other solutions already acquired by the organization may be in use. Worse still, the lack of cross-department awareness on components may cause some users to develop their own components even as viable commercial components exist in other company departments. Moreover, in these cases, where one department procures a computer component and shares its license with another department, the procuring department needs to be able to notify the other department each time a license expires or is renewed, or risk unlicensed use or component shutdown without notice to a user.

BRIEF DESCRIPTION

In one aspect, a computer-based method for managing a plurality of computer components in an organization is provided. The method is implemented using a Component Manager (CM) computing device. The CM computing device comprises a processor in communication with a memory device. The method includes receiving, by the CM computing device, from a stakeholder computing device, component data for at least one computer component of the plurality of computer components. The method also includes storing, by the CM computing device, the component data in a memory block in the memory device. The method further includes assigning, by the CM computing device, a first lifecycle classification, a domain, and at least one stakeholder to the at least one computer component by updating the memory block in the memory device. The method also includes causing, by the CM computing device, the stakeholder computing device to electronically display an interactive dashboard that includes a graphical representation of the at least one computer component. The method further includes prompting, by the CM computing device, a stakeholder to update a component utilization scheme for the at least one computer component, by electronically displaying the graphical representation.

In another aspect, a system for managing a plurality of computer components in an organization is provided. The system comprises a database configured to store component data and a component manager (CM) computing device configured to be coupled to the database. The CM computing device is configured to receive, from a stakeholder computing device, component data for at least one computer component of the plurality of computer components. The CM computing device is also configured to store the component data in the memory device. The CM computing device is further configured to assign a first lifecycle classification, a domain, and at least one stakeholder to the at least one computer component. The CM computing device is also configured to cause the stakeholder computing device to electronically display an interactive dashboard that includes a graphical representation of the at least one computer component. The CM computing device is further configured to prompt a stakeholder to update a component utilization scheme for the at least one computer component, by electronically displaying the graphical representation.

In yet another aspect, a non-transitory computer readable medium that includes computer executable instructions for managing a plurality of computer components in an organization is provided. When executed by a Component Manager (CM) computing device comprising a processor in communication with a memory device, the computer executable instructions cause the CM computing device to receive, from a stakeholder computing device, component data for at least one computer component of the plurality of computer components. The computer executable instructions also cause the CM computing device to store the component data in the memory device. The computer executable instructions further cause the CM computing device to assign a lifecycle classification, a domain, and at least one component stakeholder to the at least one computer component. The computer executable instructions also cause the CM computing device to cause the stakeholder computing device to electronically display an interactive dashboard that includes a graphical representation of the at least one computer component. The computer executable instructions further cause the CM computing device to prompt a stakeholder to update a component utilization scheme for the at least one computer component, by electronically displaying the graphical representation.

BRIEF DESCRIPTION OF THE DRAWINGS

FIG. 1 is an example configuration showing a component manager (CM) computing device in communication with various other computing devices such as component host computing devices, stakeholder computing devices, and vendor computing devices.

FIG. 2 illustrates an example configuration of a user system operated by a user, such as a stakeholder, shown in FIG. 1.

FIG. 3 illustrates an example configuration of a server system such as the CM computing device shown in FIG. 1.

FIG. 4 shows an example display configuration generated by the CM computing device.

FIG. 5 illustrates an example display configuration generated by the CM computing device showing components organized by domain.

FIG. 6 shows an example method by which the CM computing device manages computer components.

FIG. 7 shows an example configuration of a database within a computing device, along with other related computing components, that may be used to manage connected computer components.

Like numbers in the Figures indicate the same or functionally similar components.

DETAILED DESCRIPTION

Figure 1:
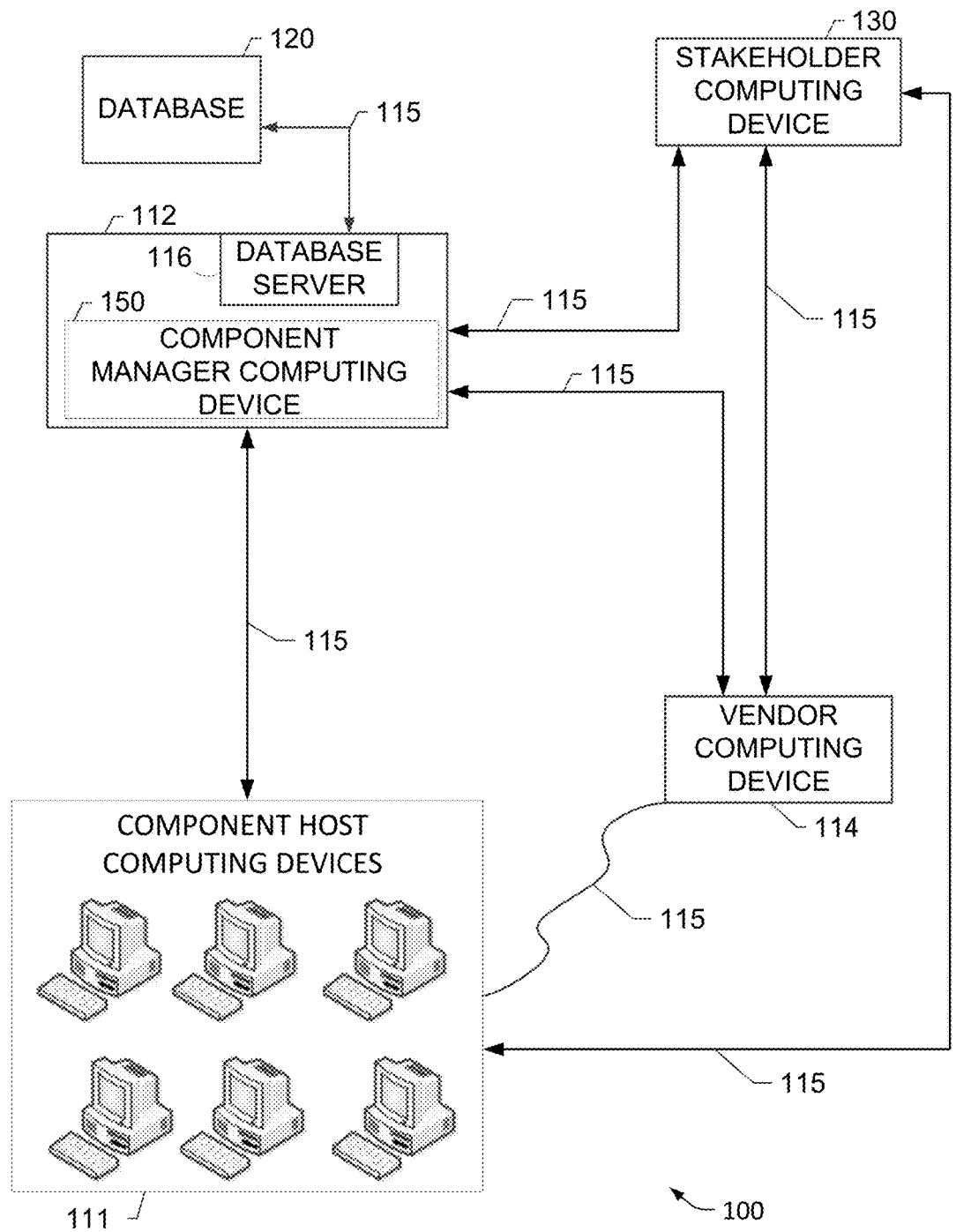
FIGS. 1-7 show example embodiments of the methods and systems described herein.

Systems and methods are described herein for managing software and hardware components through a lifecycle of these components. More specifically, the embodiments described herein relate to using a Component Manager (CM) computing device to receive, process, and transmit data about computer components to enable stakeholders of components to update the utilization of these components accordingly.

The CM computing device is configured to manage one or more computer components used within an organization throughout the life of the computer component (e.g., software components or hardware components). Hardware components may include, but are not limited to, servers, computer subcomponents (graphics cards, memory components, removable media), cables and wires, peripherals (mice, keyboards), display components, any combination of the above, or the like. Software components may be internally developed in an organization, or purchased or licensed from a vendor or other organization. Software components may be any set of computer-readable instructions, including desktop applications, mobile device applications, server software, IT management tools, firmware, plugin software, operating systems, programming tools (e.g., integrated development environments (IDEs) enabling code creation), device drivers, or the like.

More specifically, the CM computing device is configured to maintain a component database at least by receiving data about computer components, updating the component database, storing updated data regarding computer components, and directing stakeholders in the organization to update their utilization of the computer components. A stakeholder may be an organization member who creates and/or uses a computer component, one who relies on data generated by a computer component, a member dedicated to maintaining data in the component database using the CM computing device, or some combination of the above. Additionally, the CM computing device is configured to organize each component by domain. As used herein, "domain" may refer to a team, a department, a geographical unit, a community of practice, or any grouping of individuals or systems that are subsidiary to a larger organization (e.g., a corporation, university, government office, etc.). The CM computing device associates each component with a domain that is using the component. In one embodiment, one domain may be associated with a plurality of components, but each component may be associated with only one domain.

In at least some implementations, the CM computing device receives component data from a plurality of stakeholders by transmitting to stakeholders a component data request. In at least some implementations, a component data request is an electronic form including multiple fields that a stakeholder must populate with component data and return to the CM computing device. The component data request may be available as part of a larger stakeholder interface that enables component data entry, reporting, and display of components sorted by domain, category, lifecycle classification (sometimes also called "status" or "component status"), and other parameters. In at least some implementations, component data includes component attributes such as a component name, component description, component source, component version, component domain, component category, restrictions on component use, associated licenses, and one or more dates. Other data may be received including the computer component platform (e.g., Windows, Unix) and contact information for the computer component. The CM computing device is configured to store the computer component as a data object (e.g., an array, linked list, hash table, etc.) that can store the component attributes as key-value pairs (e.g., component name: Java® IDE, component domain: Software Development, component category: IDEs, etc.). One or more of the component attributes may also serve as a unique identifier. For example, the combination of component vendor: Microsoft, component name: Windows Enterprise® and version: 10 may be a unique identifier. (MICROSOFT and WINDOWS ENTERPRISE are registered trademarks of Microsoft Corporation, headquartered in Redmond, Wash., USA).

The CM computing device is configured to compare the unique identifier contained in the completed component data request form against unique identifiers in the component database. In the event that there is a match on unique identifiers, the CM computing device is configured to interpret the incoming component data as an update to data for an existing computer component. In this case, the CM computing device compares each component attribute in the component data request to a corresponding component attribute for the computer component in the component database, and updates the component database where there is a mismatch in component attribute values. Alternatively, where the unique identifier in the completed component data request form does not match any unique identifier in the component database, the CM computing device generates a new data object and populates it with data from component attributes in the completed component data request form.

The CM computing device is configured to assign a domain to each computer component. In at least some implementations, one computer component is assigned only one domain. A domain (also referred to as a "user base") may represent a department in the organization, a team of organization members, a geographical region, or some artificial grouping of computer components. In at least some implementations, assigning a domain to the computer component includes assigning a managing stakeholder (such as a domain owner) to the computer component. Component data associated with the computer component may then be modified only by the managing stakeholder or the appointed application administrator.

The CM computing device is configured to assign a lifecycle classification (or status) to each computer component. In at least some implementations, a computer component is assigned one of "Emerging," "Preferred," "Supported," "Retiring," and "Avoid" lifecycle classifications. Moreover, each lifecycle classification may be assigned a default color for ease of display and understanding. In one embodiment, Emerging is assigned blue, Preferred is assigned green, Supported is assigned Yellow, Retiring is assigned orange, and Avoid is assigned red. So for example, if a component is in the Preferred lifecycle classification and is displayed (e.g., on a stakeholder computing device screen), it may appear associated with the color green.

Stakeholders may define any useful classifications denoting any particular point in the computer component's lifecycle. A lifecycle classification represents a status of the computer component, defined at least by its age, nature of usage in the organization, and availability of alternative or newer versions for the computer component. For example, an organization may use multiple versions of Microsoft Office®. (MICROSOFT OFFICE is a registered trademark of Microsoft Corporation, headquartered in Redmond, Wash., USA). Based on received component data, the CM computing device may assign Office 2013® to the Preferred lifecycle classification because it is currently in use. Office 2016® may be assigned to Emerging because it is in use by early adopters only but not the full organization. Office 2007® may be still in use but assigned to Supported in case it is not the preferred version but still is supported by the software vendor. Alternatively, Office 2007® may be assigned to Retiring in case it is going to be phased out soon. Office 2000® may be assigned to Avoid based on received component data that notes that Office 2000® no longer serves the needs of the organization. (OFFICE 2000, OFFICE 2007, OFFICE 2013, and OFFICE 2016 are registered trademarks of Microsoft Corporation, headquartered in Redmond, Wash., USA).

A lifecycle classification may be assigned by entering a status date for each of the lifecycles based on received component data (e.g., where a stakeholder enters a particular lifecycle classification in the component data request form). In other embodiments, the CM computing device may be configured to move a computer component from one lifecycle classification to the next after a certain time period (e.g., a computer component may move from Preferred to Supported after 12 months, then to Retiring after another 12 months, and so on). In still other embodiments, the CM computing device may employ one or more lifecycle models that may be specific to component category. For example, the organization may decree that all computer components in category "Testing Components" must remain in the "Preferred" lifecycle classification for no longer than 6 months, after which they are moved to "Supported." Using this lifecycle model, the CM computing device regularly queries component data status dates for each lifecycle. This triggers the lifecycle status change and it applies the model to all computer components marked "Testing Components," moving any Components in the Preferred lifecycle classification for longer than 6 months into the Supported lifecycle classification. Additionally, the lifecycle status change may be triggered by a date in each lifecycle status. For example, Jan. 1, 2016 may be the supported status date. On Jan. 1, 2016 the product will move from Preferred to Supported.

The CM computing device is configured to display computer components to a stakeholder, using a specialized stakeholder interface. Computer components can be displayed at least by domain, by lifecycle classification, and by component category. The stakeholder interface also enables a stakeholder to tag computer components using predefined or user-defined tags (e.g., "My Team Components"), further enabling the stakeholder to view all computer components associated with a particular tag.

The CM computing device is configured to transmit a notification to one or more stakeholders. In at least some implementations a notification comprises an alert that, for example, a particular computer component has moved from one lifecycle classification to the next. A notification may also comprise alerts related to scheduled component database updates, component data requests, and license expiration notifications (e.g., where one domain is using software that is licensed to another domain). The CM computing device can send an alert when a percentage of the software is outside of a specified range specified by the domain owner. For example, when software assigned the "Retiring" lifecycle classification exceeds 10% or more of the domain owners software portfolio, the CM computing device may send an alert or other notification.

The CM computing device is also configured to determine an operational health for each domain, by determining the proportion of computer components used by that domain that are in particular lifecycle classifications. A domain using computer components that are all "Preferred" may be in better operational health than a domain using computer components that are all in the "Avoid" lifecycle classification. In at least some implementations, the CM computing device determines the proportion of computer components marked "Preferred," and "Supported," compares that proportion to the complete set of components for the domain, and issues a measure of operational health, for example as a percentage.

The CM computing device is also configured to issue a series of reports. In one embodiment, the three reports are the Lifecycle Report, the Taxonomy Report, and the Full report. The Lifecycle report displays the lifecycle status of individual titles for the next three years by domain. The Taxonomy Report shows software by a hierarchy of categories. The Full report displays all the information available for a software title. In at least some implementations, the reports may be exported in other formats (e.g., Microsoft Excel®).

The technical problems addressed by this system include at least one of: (i) inability to centrally control all computer components in use, (ii) lack of coordination between disparate computer systems due to lack of a central computer system directing activities such as updates, fixes, etc., and (iii) data redundancy issues caused by multiple (potentially outdated) copies of software being in use, and (iv) increased risk of security breaches (e.g., introduction of computer viruses or malware) due to there being no centralized command of all components in use, some of which may be outdated and vulnerable to attack.

The methods and systems described herein may be implemented using computer programming or engineering techniques including computer software, firmware, hardware, or any combination or subset thereof, wherein the technical effects may be achieved by performing at least one of the following steps: (a) receiving, by the CM computing device, from a stakeholder computing device, component data for at least one computer component of a plurality of computer components, (b) storing, by the CM computing device, the component data in a memory block in the memory device, (c) assigning, by the CM computing device, a lifecycle classification, a domain, and at least one stakeholder to the at least one computer component by updating the memory block in the memory device (d) causing, by the CM computing device, the stakeholder computing device to electronically display an interactive dashboard including a graphical representation of the at least one computer component, and (e) prompting, by the CM computing device, a stakeholder to update a component utilization scheme for the at least one computer component based on the graphical representation.

The resulting technical benefits achieved by this system include at least one of: (i) improved performance of each computer component due to a centralized inventorying that enables more robust maintenance, and upgrades of components and (ii) reduced error rates and security issues for computer components caused by a central CM computing device continuously monitoring and scrutinizing each component throughout its lifecycle.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to managing computer components in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a block diagram of an example component management environment 100, in which a variety of computing devices are communicatively coupled to each other via network connections 115. Network connections 115 may be Internet, LAN/WAN, or other connections capable of transmitting data across computing devices. Environment 100 shows a component manager (CM) computing device 150 and a database server 116. In one embodiment, CM computing device 150 and database server 116 are components of a component manager (CM) system 112. CM system 112 may be a server, a network of multiple computer devices, a virtual computing device, or the like. CM computing device 150 is connected to at least one stakeholder computing device 130, a vendor computing device 114, and a plurality of component host computing devices 111. Stakeholder computing device 130 is also connected to vendor computing device 114 and to component host computing devices 111.

Database server 116 is connected to database 120, which contains information on a variety of matters, as described below in greater detail. In one embodiment, database 120 is stored on CM system 112 and can be accessed by potential users of CM system 112. In an alternative embodiment, database 120 is stored remotely from CM system 112 and may be non-centralized.

Environment 100 shows a group of computing devices collectively referred to herein as component host (CH) computing devices 111. A component host computing device represents any hardware-based host for a software or hardware component. For example, a mainframe computer may be a component host computing device. The mainframe computer may house a number of processor cores that each process computer-executable instructions and are hardware components managed by the CM computing device 150. Each processor core may operate using one or more operating systems (i.e., operating system software). Each operating system is itself a computer component hosted by the mainframe computer. The operating system may run several other software suites (e.g., word processing software applications, database management software, integrated development environments (IDEs) for computer programming, etc.). Each software suite may also count as a component managed by the CM computing device 150.

CM computing device 150 is configured to send and receive "lifecycle data" to CH computing devices 111. As used herein, lifecycle data may refer to data about each hosted component that pertains to the component's version, installation date, usage pattern, domain of use, or the like. In one embodiment, CM computing device 150 is configured to process lifecycle data and generate a lifecycle classification or status. Moreover, CM computing device 150 is configured to store an entry for each component in database 120, such as in a dedicated memory block, memory section, memory address or memory area. CM computing device 150 is configured to update the component entry with the generated status, and update the generated status as newer lifecycle data is received from various CH computing devices 111.

CM computing device 150 is also configured to update the component entry in memory with an identifier (e.g., a tag) associated with the component. For example, stakeholder computing device 130 may transmit an electronic instruction to CM computing device 150 directing it to associate a particular label with a component in memory (e.g., the tag "Programming" with a component used for writing computer programs or code). CM computing device 150 is configured to receive the instruction, process the instruction and update the component entry in memory accordingly. For example, CM computing device 150 may first determine what tags are already associated with the component, compare the incoming tag with existing tags, determine that there is no duplication, and update a data structure in memory storing all tags for the component with the newly associated tag. CM computing device 150 may also transmit a notification to stakeholder computing device 130 communicating that the tag has been associated, causing a display on stakeholder computing device 130 to display the notification and update any associated dashboard, report, or the like.

CM computing device 150 is also configured to programmatically update a status for a component, given specific inputs. For example, stakeholder computing device 130 will provide a number of component identifiers and specific dates by which each component is to move from one status to the next. Stakeholder computing device 130 will also provide a usage level (e.g., how many users use each component), and a rating (e.g., four stars out of five). For example, stakeholder computing device 130 may communicate that Components A and B, which perform similar functions, are scheduled to move to the status "Retiring" in the year 2016. However, component A has a higher usage level (more users) and higher rating (more stars out of five) than component B. Accordingly, absent a specific date in 2016 being provided, CM computing device 150 is configured to move Component B into the "Retiring" status sooner than Component A since Component A is more preferable. In one embodiment, CM computing device 150 executes computer-readable instructions that—given a numeric year, usage level, rating, and expected status as input arguments—for two or more components will provide a specific calendar date by which each component should be moved into that status.

Alternatively, where specific dates are provided, CM computing device 150 is configured to assign each date to a component entry in memory and associate it with a particular status. CM computing device 150 continuously monitors the current date and updates a component's status as a milestone date (e.g., when a component is to be moved from "Retiring" into "Avoid") arrives. In one embodiment, once a component reaches status "Avoid" CM computing device 150 ends status updating processes for that component, since the component is potentially no longer in use. In another embodiment, CM computing device 150 is configured to periodically contact a user or stakeholder for the component marked "Avoid" to request status updates or suggest archiving or deletion of the component data entry.

CM computing device 150 is also configured to provide instructions to stakeholders on when and why to alter the usage of a component. For example, vendor computing device 114 may send CM computing device 150 an alert regarding a computer component which states that the computer component is vulnerable to a certain computer virus.

CM computing device 150 is also configured to transmit lifecycle data to stakeholder computing device 130. In one embodiment, such transmission may take the form of reports, alerts, or other periodic communications. In another embodiment, users of stakeholder computing device 130 may also query CM computing device 150 using a portfolio display (described below) to review the status of each component. In yet another embodiment, CM computing device 150 may format and display lifecycle data as a dashboard for quick review by a user of stakeholder computing device 130.

In one embodiment, CH computing devices 111 are communicatively coupled to one or more vendor computing devices 114. Vendor computing device 114 may transmit updates to components hosted on CH computing devices 111. Updates may include patches, fixes, upgrades, or the like. Alternatively, CM computing device 150 may receive updates from vendor computing devices 114 and deploy to CH computing devices 111 as necessary.

Database 120 may include a single database having separated sections or partitions or may include multiple databases, each being separate from each other. Database 120 may store component data for each component used by the organization that operates CM computing device 150. Component data may include data regarding a component's status/lifecycle classification, version, installation date, update dates, or the like. Database 120 may store component license data, user data (e.g., the departments or teams that use a component), domain data, stakeholder data, component version data, or the like. Database 120 may also store stakeholder instructions, updates, queries, version updates or the like. Database 120 may also store tagging data (e.g., where a stakeholder tags a component with a specific label). Database 120 may also store patches, fixes, update schedules, and other update data received from component vendors. Database 120 may also store component maintenance data (e.g., component health checks, data integrity checks, or the like). Database 120 may also store report data (e.g., periodic reports CM computing device 150 may provide to various stakeholders regarding particular components). Database 120 may also store various algorithms that are used to programmatically update a component's status or lifecycle classification. Database 120 may also store a variety of template views for stakeholders, based on predefined preferences or usage history (e.g., components by domain, all retired components, components that require urgent patches, etc.).

In the example embodiment, CM computing device 150 does not consist of generic computer hardware, nor does it require merely generic computer instructions to perform the above functions. Rather, CM computing device 150 is a specially designed and customized computer device built to perform the specific function of managing and monitoring a component throughout its entire lifecycle by receiving inputs from other computing devices (stakeholder computing devices, vendor computing devices, component host computing devices etc), processing those inputs, and generating outputs (e.g., updated lifecycle data) that are transmitted to other computing devices.

Figure 2:
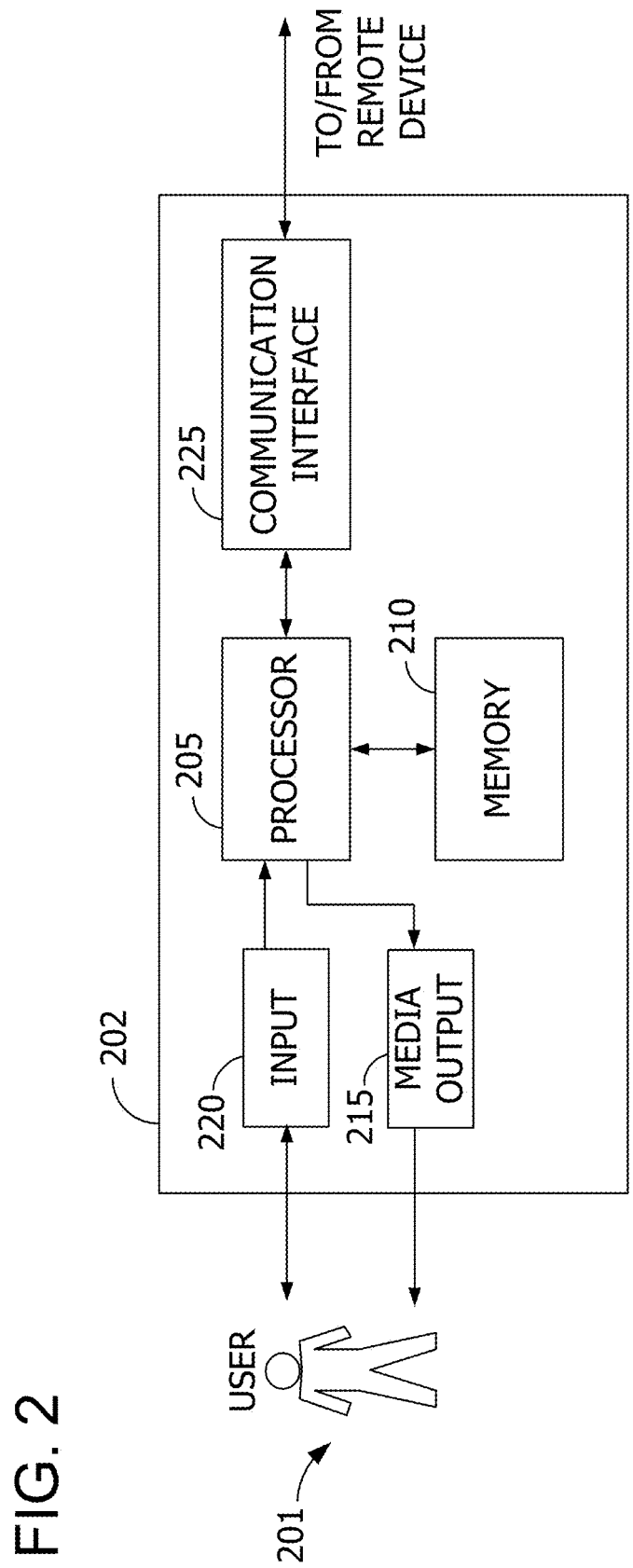

FIG. 2 illustrates an example configuration of a user system operated by a user, such as a stakeholder for a component. User system 202 may include, but is not limited to, stakeholder computing device 130. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as server CM system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a web site from server CM system 112. A client application allows user 201 to interact with a server application from server CM system 112.

Figure 3:
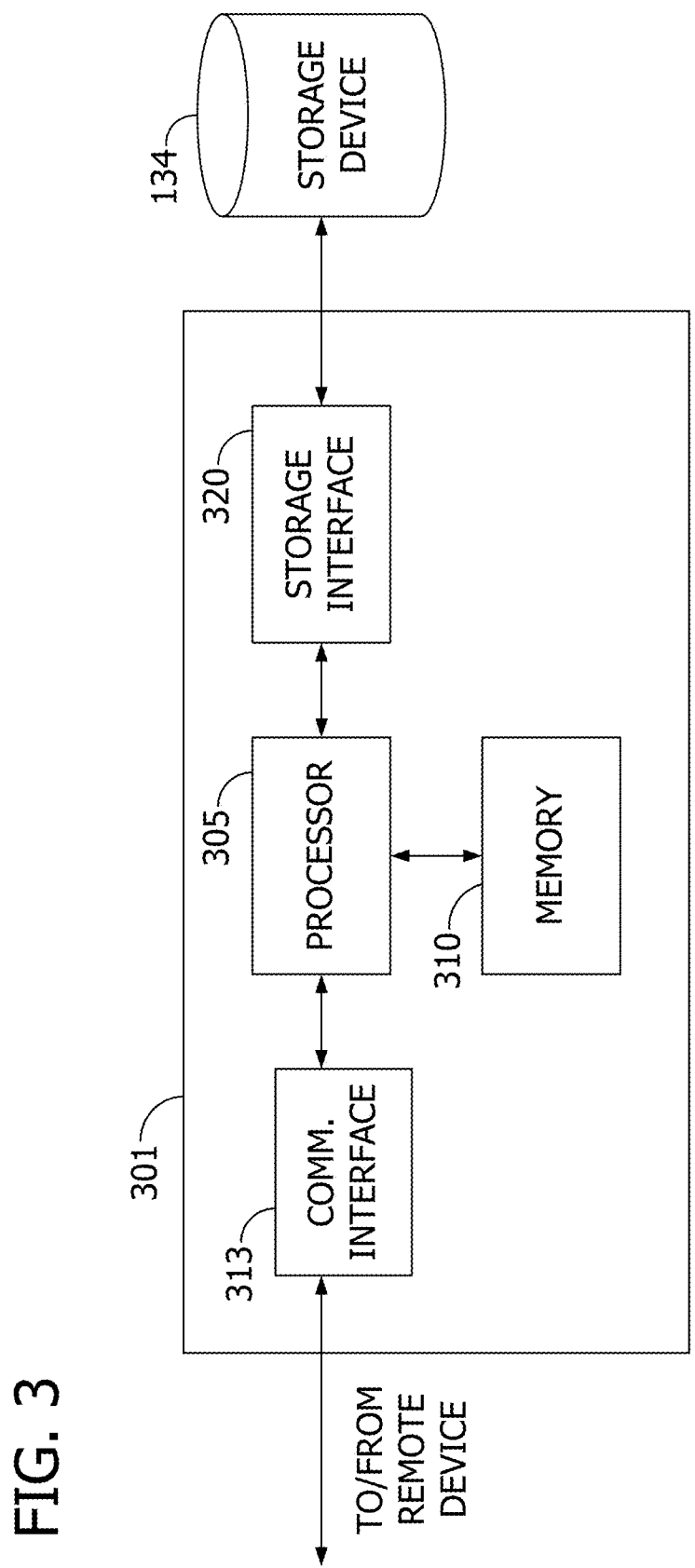

FIG. 3 illustrates an example configuration of a server system 301 such as the CM system 112 shown in FIG. 1 that includes CM computing device 150. Server system 301 may include, but is not limited to, database server 116 or CM computing device 150 (shown in FIG. 1). In some embodiments, server system 301 is similar to CM system 112 (shown in FIG. 1).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive communications from vendor computing devices 114 via the Internet, as illustrated in FIG. 1.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 1). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
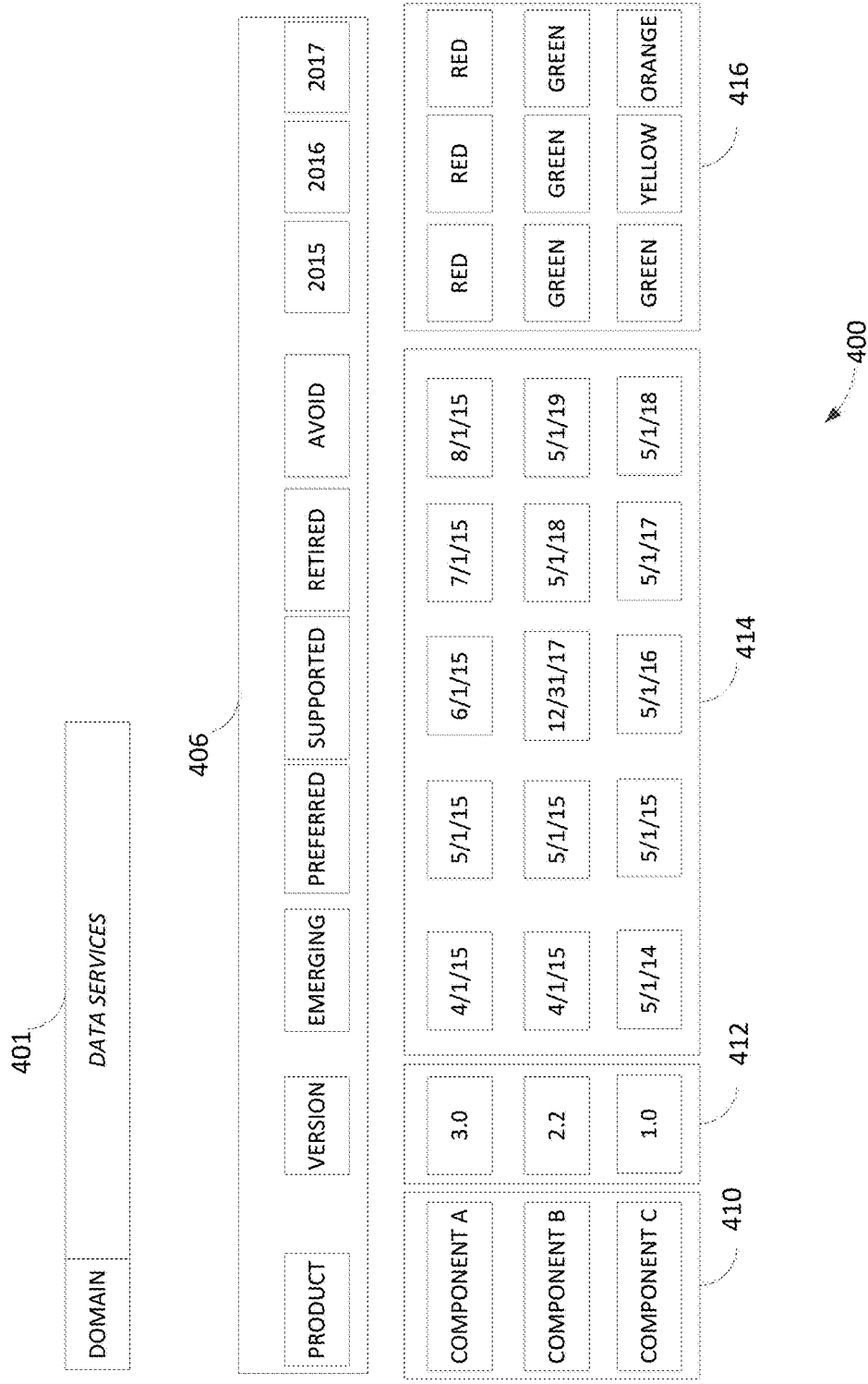

FIG. 4 shows an example display configuration 400 of component data as processed and displayed by CM computing device 150 (shown in FIG. 1). In one embodiment, CM computing device 150 is configured to cause one or more display devices (e.g., associated with stakeholder computing device 130 shown in FIG. 1) to show display configuration 400.

In one embodiment, display configuration 400 represents all components within a particular domain. CM computing device 150 is configured to render domain selector 401 on display configuration 400. Domain selector 401 may be a dropdown list, option selector, picker, real-time search prompt, freeform text box, list of domains selectable via checkboxes or radio buttons, or any type of interactive control enabling a user of stakeholder device 130 to select a domain to view components therein. In one embodiment, when a user selects a domain titled "Data Services" using domain selector 401. In response to the selection, CM computing device 150 causes lifecycle data for Component A, Component B, and Component C to be displayed via display configuration 400.

As shown in FIG. 4, lifecycle data is denoted using a plurality of data labels 406. Also shown is component list 410, version list 412, lifecycle dates 414, and lifecycle indicators 416. In one embodiment, lifecycle indicators 416 take the form of colored bricks (represented in FIG. 4 as the color names). In other embodiments, lifecycle indicators may be represented by the actual status (e.g., Emerging, Preferred, etc.), numbers, symbols, other alphanumeric characters, sliding scales, stars out of five, or any other symbolic display scheme enabling a user to understand the status of a component. A legend or key (not shown) may be displayed to assist the user to further interpret lifecycle indicators 416.

For purposes of illustration, it is assumed that the current date of the display is Sep. 1, 2015. Accordingly, and in an example embodiment, CM computing device 150 is configured to display that Component A has version 3.0, was in Emerging status as of Apr. 1, 2015, Preferred status as of May 1, 2015, Supported status as of Jun. 1, 2015, Retired status as of Jul. 1, 2015, and Avoid status as of Aug. 1, 2015. In one embodiment, lifecycle indicators 416 for Component A are marked RED, denoting that as of the current date of Sep. 1, 2015 (which is after the Avoid date of Aug. 1, 2015), Component A remains in a status of Avoid. By default, CM computing device 150 is configured to assign the status of Avoid to Component A for all future years, barring receipt of updated lifecycle data from stakeholder computing device 130.

Similarly, Component B is shown to have version 2.2, and to be in Emerging status as of Apr. 1, 2015, Preferred status as of May 1, 2015, Supported status as of May 1, 2017, Retired status as of Jul. 1, 2018, and Avoid status as of Aug. 1, 2019. As of the current date (Sep. 1, 2015), Component B is assigned the status of Preferred. CM computing device 150 is configured to display that through 2015, 2016, and 2017, Component B will remain in Preferred status, i.e., GREEN.

Similarly, Component C is shown to have version 1.0, and to be in Emerging status as of May 1, 2014, Preferred status as of May 1, 2015, Supported status as of May 1, 2016, Retired status as of May 1, 2017, and Avoid status as of May 1, 2018. As of the current date (Sep. 1, 2015), Component C is in Preferred status (shown as GREEN in lifecycle indicators 416 for 2015). CM computing device 150 is configured to display YELLOW (Supported) for 2016 and ORANGE (Retiring) for 2017 for Component C, according to the respective dates on which status will change.

Figure 5:
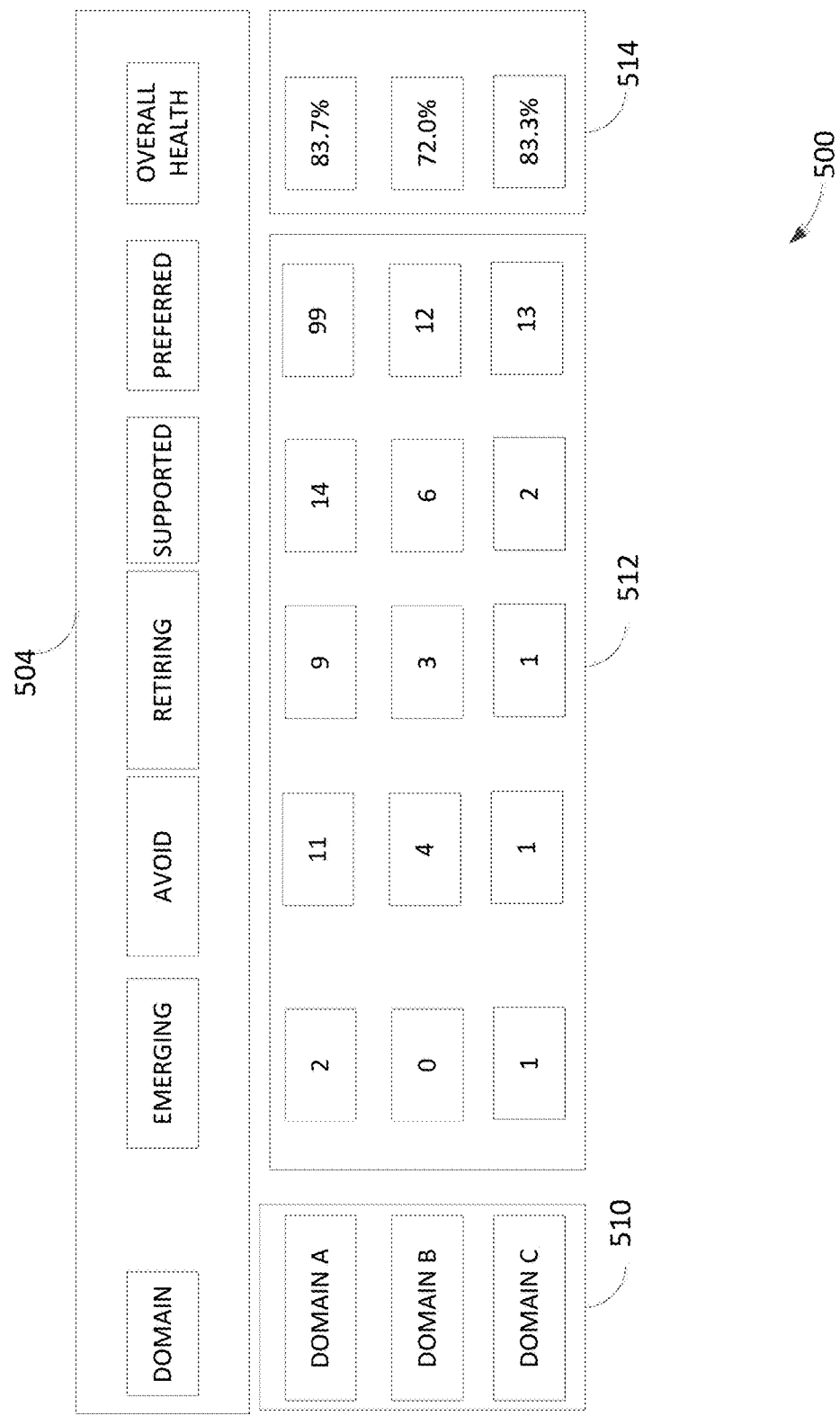

FIG. 5 shows example display configuration 500 whereby CM computing device 150 (shown in FIG. 1) is configured to display an overall status of a plurality of domains. As shown, display configuration 500 includes a plurality of data labels 504, a domain list 510, component count data 512, and overall health data 514. In one embodiment, domain list 510 includes a plurality of domains that are part of an organization, (e.g., Domain A, Domain B, Domain C). Component count data 512 represents a display of all components within a domain, organized by status. For example, Domain A is represented to use 2 components with status Emerging, 11 with status Avoid, 9 with status Retiring, 14 with status Supported, and 99 with status Preferred.

CM computing device 150 is configured to determine an overall health indicator for each domain, and display it as part of overall health data 514. In one embodiment, CM computing device 150 counts only Preferred and Supported components toward the overall health of a domain. In other words, the number of Preferred and Supported components represent a measure of how robust a domain is in terms of its use of software and hardware components. In one embodiment, CM computing device 150 is configured to calculate the overall health indicator by calculating a percentage of Preferred and Supported components as a share of the total. Accordingly, for Domain A, overall health indicator=(99+14)/(99+14+9+11+2)=83.7%.

In another embodiment, CM computing device 150 is configured to include components with other statuses (e.g., Emerging) as well into the percentage calculation. In yet another embodiment, CM computing device 150 is configured to incorporate component usage levels or rating information into the determination of the overall health indicator. For example, where two domains have identical overall health indicators initially according to component counts, one domain may have a higher overall health indicator because it has a higher usage level or rating. In one embodiment, CM computing device 150 is configured to add a predefined premium to the overall health indicator to reflect higher component rating. For example, where ratings are at or below four stars out of five, for all components in Domain A, the premium may be zero. Where a component is rated five stars of five, a weighting of 0.1% may be added to the overall health indicator for each such component, indicating that the domain is in better health overall due to higher user satisfaction with the component(s) in use.

Figure 6:
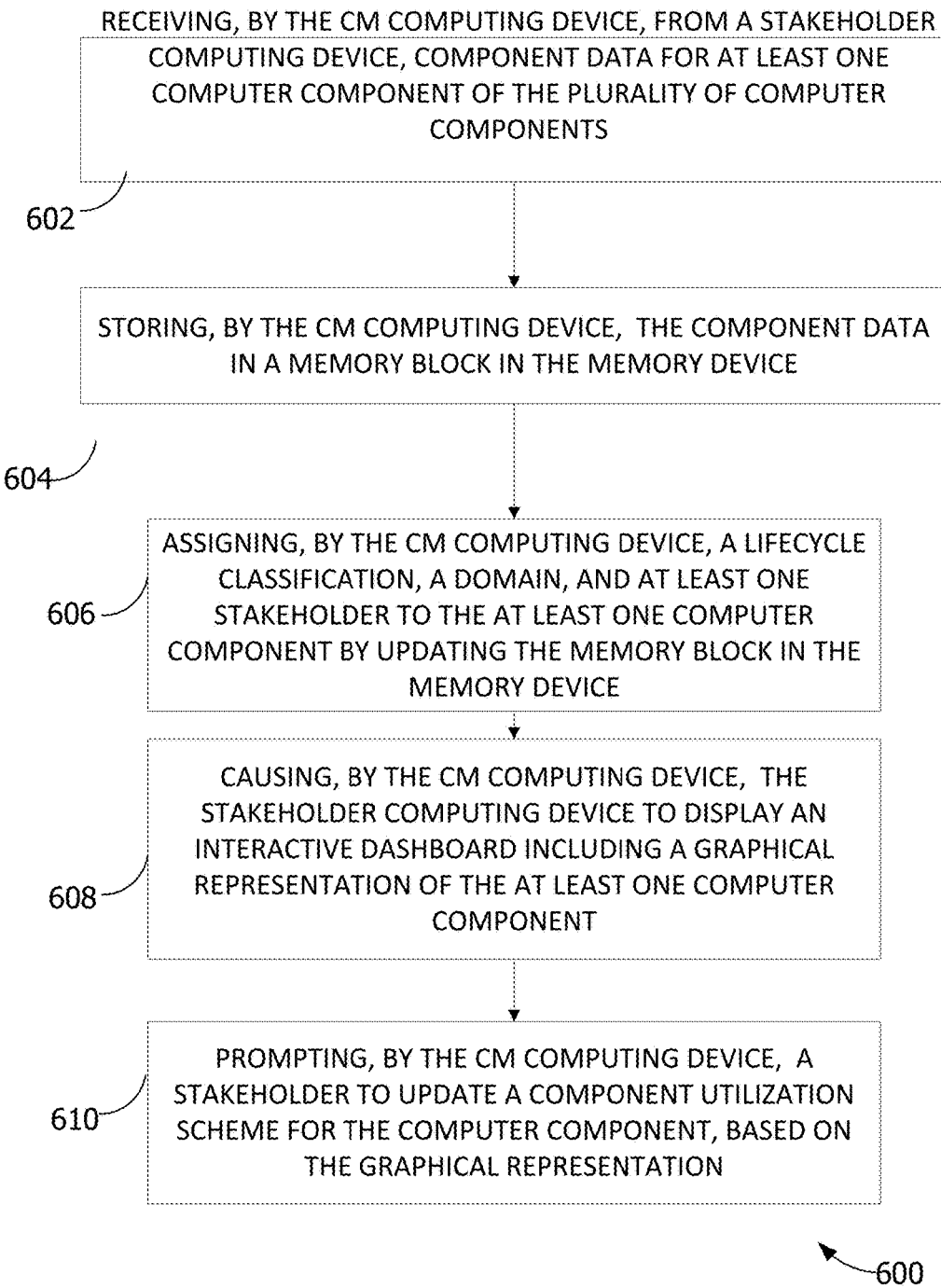

FIG. 6 shows an example method by which CM computing device 150 manages the lifecycle of computer components. The CM computing device receives 602, from a stakeholder computing device, component data for at least one computer component of the plurality of computer components. The CM computing device stores 604 the component data in a memory block in the memory device. The CM computing device assigns 606 a lifecycle classification, a domain, and at least one stakeholder to the at least computer component by updating the memory block in the memory device. The CM computing device causes 608 the stakeholder computing device to electronically display an interactive dashboard that includes a graphical representation of the at least one computer component. The CM computing device prompts 610 a stakeholder to update a component utilization scheme for the at least one computer component, by electronically displaying the graphical representation.

Figure 7:
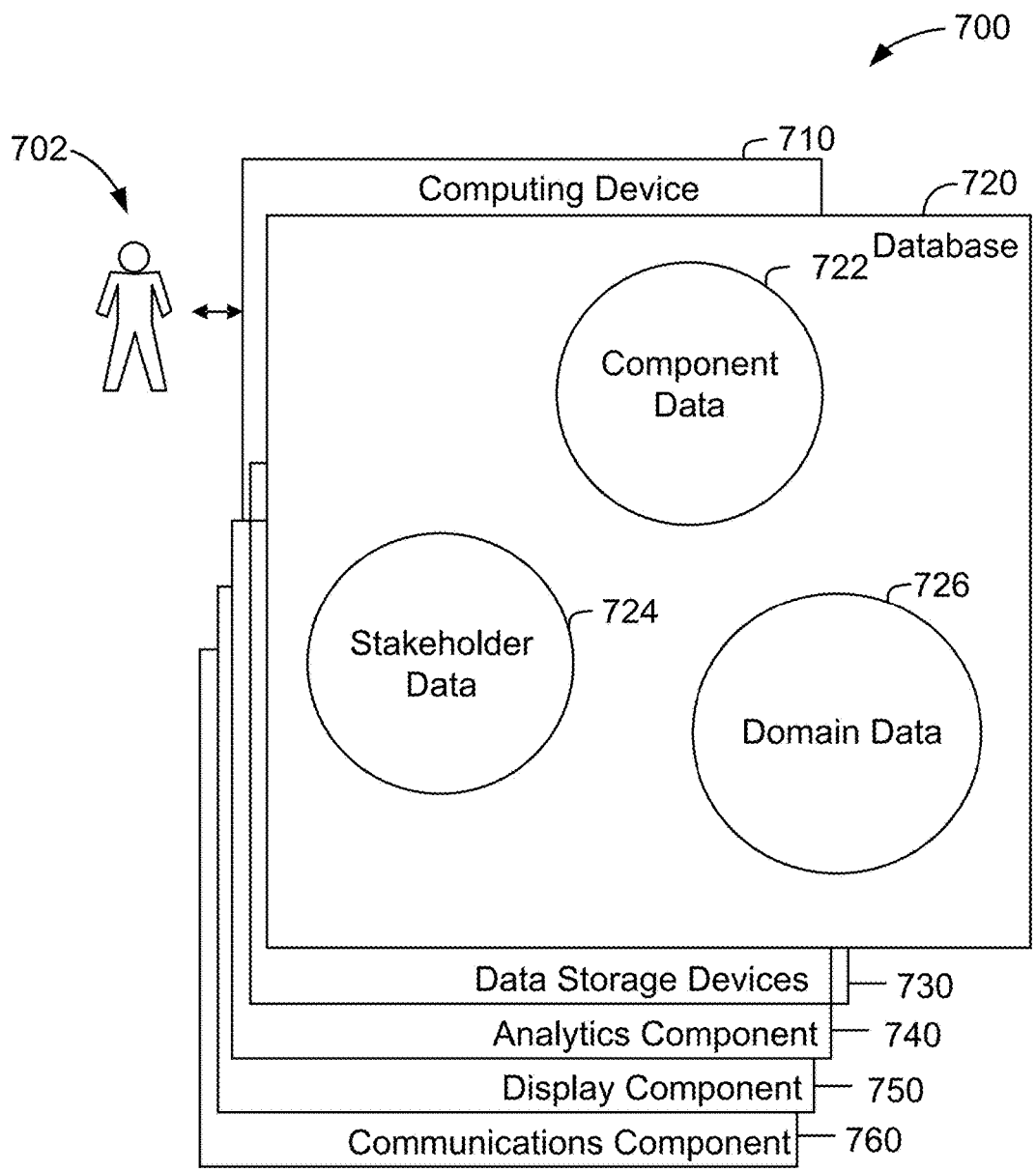

FIG. 7 shows an example configuration of a database 700 within a computing device, along with other related computing components, that may be used to manage the lifecycle of computer components. In some embodiments, computing device 710 is similar to CM system 112 (shown in FIG. 2). User 702 (such as a stakeholder for a component) may access computing device 710 in order to manage a computer component. In some embodiments, database 720 is similar to database 120 (shown in FIG. 2). In the example embodiment, database 720 includes component data 722, stakeholder data 724, and domain data 726. Component data 722 includes data regarding each component (e.g., component identifiers, version, status, associated domain, associated stakeholders, usage levels, ratings, or the like). Stakeholder data 724 includes data about stakeholders for each component (e.g., stakeholder identifiers, stakeholder computing device identifiers, stakeholder associated domains, permission data, authorization data, records of updates made by stakeholders, or the like). Domain data 726 includes component lists, components according to status, overall health data, domain identifiers, responsible stakeholders, or the like.

Computing device 710 also includes data storage devices 730. Computing device 710 also includes analytics component 740 that processes lifecycle data received from various component host computing devices and from stakeholder computing devices at least in order to generate display configurations 400 and 500. Computing device 710 also includes display component 750 that receives processed lifecycle data from analytics component 740 and converts it into various formats in order to provide lifecycle data in a format compatible with various different stakeholder computing devices. Computing device 710 also includes communications component 760 which is used to communicate with stakeholder computing devices, vendor computing devices, and component host computing devices using predefined network protocols such as TCP/IP (Transmission Control Protocol/Internet Protocol) over the Internet.

As will be appreciated based on the foregoing specification, the above-described embodiments of the disclosure may be implemented using computer programming or engineering techniques including computer software, firmware, hardware or any combination or subset thereof, wherein the technical effect is to manage computer components over their lifecycles in an organization. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for managing a plurality of computer components, the method implemented using a Component Manager (CM) computing device, wherein the CM computing device comprises a processor in communication with a memory device, the method comprising:

receiving, by the CM computing device, component data for at least one computer component of the plurality of computer components;

storing, by the CM computing device, the component data in a memory block in the memory device;

assigning, by the CM computing device, a first lifecycle classification to the at least one computer component by updating the memory block in the memory device, wherein the first lifecycle classification represents a status of the at least one computer component;

storing one or more lifecycle models within the memory device, the CM computing device configured to use the one or more lifecycle models to update the lifecycle classification assigned to the at least one computer component when certain attributes of the at least one computer component satisfy one of the one or more lifecycle models;

upon determining that the certain attributes of the at least one computer component satisfy one of the one or more lifecycle models, automatically updating the memory block in the memory device by applying the lifecycle model stored within the memory device, the CM computing device updating the lifecycle classification assigned to the at least one computer component from the first lifecycle classification to a second lifecycle classification;

determining, by the CM computing device, at least one future lifecycle transition date specified by an organization rule for the at least one computer component, wherein the at least one future lifecycle transition date includes at least a first future lifecycle transition date when the at least one computer component should be updated from the second lifecycle classification to a third lifecycle classification; and causing, by the CM computing device, a lifecycle report to be displayed, wherein the lifecycle report includes a lifecycle status for the at least one computer component over a specified future period of time, the lifecycle status including the at least one future lifecycle transition date, wherein the method facilitates one or more of i) centrally controlling the plurality of computer components, ii) coordinating between disparate computer systems to direct updates and fixes, iii) resolving data redundancy issues caused by multiple copies of software being in use, and iv) decreasing risk of security breaches.

2. A method in accordance with claim 1, wherein receiving component data comprises receiving at least one component attribute for the at least one computer component, and wherein the at least one component attribute includes at least one of a component name, component description, component source, component version, component domain, component category, restrictions on component use, associated licenses, and at least one date at which the at least one computer component is to be assigned the second lifecycle classification.

3. A method in accordance with claim 1, wherein automatically updating the memory block in the memory device by applying the lifecycle model further comprises applying the lifecycle model to the component data stored in the memory block for the at least one computer component and assigning the second lifecycle classification to the at least one computer component when a predefined time period is reached, wherein the lifecycle model includes at least one predefined time period associated with a domain and a lifecycle classification such that, when the predefined time period passes for a computer component having said domain and said lifecycle classification, the lifecycle model causes said lifecycle classification for the computer component to be updated.

4. A method in accordance with claim 1, wherein assigning the first lifecycle classification includes assigning at least one of an emerging lifecycle classification, a supported lifecycle classification, a preferred lifecycle classification, an avoidance lifecycle classification, and a retirement lifecycle classification to the at least one computer component.

5. A method in accordance with claim 1, wherein assigning the first lifecycle classification to the at least one computer component comprises assigning the first lifecycle classification based upon a current usage of multiple versions of the at least one computer component.

6. A method in accordance with claim 1, further comprising organizing the plurality of computer components by lifecycle classification, including calculating a sum of computer components assigned to each lifecycle classification, and causing an interactive dashboard to be displayed on a stakeholder computing device including the calculated sum of computer components assigned to each lifecycle classification.

7. A method in accordance with claim 1, further comprising:
  determining an operational health indicator for a domain by determining a percentage of the plurality of computer components for the domain that are assigned to a preferred lifecycle classification and a supported lifecycle classification; and
  causing a stakeholder computing device to display an interactive dashboard including the operational health indicator for the domain.

8. A system for managing a plurality of computer components, the system comprising:
  a database configured to store component data; and
  a component manager (CM) computing device configured to be coupled to the database and comprising a processor, the CM computing device further configured to:
  receive component data for at least one computer component of the plurality of computer components;
  store the component data in a memory block in the database;
  assign a first lifecycle classification to the at least one computer component by updating the memory block in the database, wherein the first lifecycle classification represents a status of the at least one computer component;
  store one or more lifecycle models within the database;
  use the one or more lifecycle models to update the lifecycle classification assigned to the at least one computer component when certain attributes of the at least one computer component satisfy one of the one or more lifecycle models;
  upon determining that the certain attributes of the at least one computer component satisfy the one of the one or more lifecycle models, automatically update the memory block in the database by applying the lifecycle model stored within the database, the CM computing device updating the lifecycle classification assigned to the at least one computer component from the first lifecycle classification to a second lifecycle classification;
  determine at least one future lifecycle transition date specified by an organization rule for the at least one computer component, wherein the at least one future lifecycle transition date includes at least a first future lifecycle transition date when the at least one computer component should be updated from the second lifecycle classification to a third lifecycle classification; and
  cause a lifecycle report to be displayed, wherein the lifecycle report includes a lifecycle status for the at least one computer component over a specified future period of time, the lifecycle status including the at least one future lifecycle transition date, wherein the system facilitates one or more of i) centrally controlling the plurality of computer components, ii) coordinating between disparate computer systems to direct updates and fixes, iii) resolving data redundancy issues caused by multiple copies of software being in use, and iv) decreasing risk of security breaches.

9. A system in accordance with claim 8, wherein, to receive component data, the CM computing device is further configured to receive at least one component attribute for the at least one computer component.

10. A system in accordance with claim 9, wherein the at least one component attribute includes at least one of a component name, component description, component source, component version, component domain, component category, restrictions on component use, associated licenses, and at least one date at which the at least one computer component is to be assigned the second lifecycle classification.

11. A system in accordance with claim 8, wherein, to automatically update the memory block in the database, the CM computing device is further configured to apply the lifecycle model to the component data stored in the memory block for the at least one computer component and assign the second lifecycle classification to the at least one computer component when a predefined time period is reached, wherein the lifecycle model includes at least one predefined time period associated with a domain and a lifecycle classification such that, when the predefined time period passes for a computer component having said domain and said lifecycle classification, the lifecycle model causes said lifecycle classification for the computer component to be updated.

12. A system in accordance with claim 8, wherein, to assign the first lifecycle classification, the CM computing device is further configured to assign at least one of an emerging lifecycle classification, a supported lifecycle classification, a preferred lifecycle classification, an avoidance lifecycle classification, and a retirement lifecycle classification to the at least one computer component.

13. A system in accordance with claim 8, wherein the CM computing device is further configured to organize the plurality of computer components by component attribute, including calculating a sum of computer components assigned to each lifecycle classification, and to cause an interactive dashboard to be displayed on a stakeholder computing device including the calculated sum of computer components assigned to each lifecycle classification.

14. A system in accordance with claim 8, wherein the CM computing device is further configured to:
  determine an operational health indicator for a domain, by determining a percentage of the plurality of computer components for the domain that are assigned to a preferred lifecycle classification and a supported lifecycle classification; and
  cause a stakeholder computing device to display an interactive dashboard including the operational health indicator for the domain.

15. A non-transitory computer readable medium that includes computer executable instructions for managing a plurality of computer components, wherein when executed by a Component Manager (CM) computing device comprising a processor in communication with a memory device, the computer-executable instructions cause the CM computing device to:
  receive component data for at least one computer component of the plurality of computer components;
  store the component data in a memory block in the memory device;
  assign a first lifecycle classification to the at least one computer component by updating the memory block in the memory device, wherein the first lifecycle classification represents a status of the at least one computer component;
  store one or more lifecycle models within the memory device, the CM computing device configured to use the one or more lifecycle models to update the lifecycle classification assigned to the at least one computer component when certain attributes of the at least one computer component satisfy one of the one or more lifecycle models;
  upon determining that the certain attributes of the at least one computer component satisfy one of the one or more the lifecycle models, automatically update the memory block in the memory device by applying the lifecycle model stored within the memory device, the CM computing device updating the lifecycle classification assigned to the at least one computer component from the first lifecycle classification to a second lifecycle classification;
  determine at least one future lifecycle transition date specified by an organization rule for the at least one computer component, wherein the at least one future lifecycle transition date includes at least a first future lifecycle transition date when the at least one computer component should be updated from the second lifecycle classification to a third lifecycle classification; and
  cause a lifecycle report to be displayed, wherein the lifecycle report includes a lifecycle status for the at least one component over a specified future period of time, the lifecycle status including the at least one future lifecycle transition date, wherein the non-transitory computer readable medium facilitates one or more of i) centrally controlling the plurality of computer components, ii) coordinating between disparate computer systems to direct updates and fixes, iii) resolving data redundancy issues caused by multiple copies of software being in use, and iv) decreasing risk of security breaches.

16. A non-transitory computer readable medium in accordance with claim 15, wherein the computer-executable instructions cause the CM computing device to receive at least one component attribute for the at least one computer component.

17. A non-transitory computer readable medium in accordance with claim 16, wherein the at least one component attribute includes at least one of a component name, component description, component source, component version, component domain, component category, restrictions on component use, associated licenses, and at least one date at which the at least one computer component is to be assigned the second lifecycle classification.

18. A non-transitory computer readable medium in accordance with claim 15, wherein, to automatically update the memory block in the memory device by applying the lifecycle model, the computer-executable instructions cause the CM computing device to apply the lifecycle model to the component data stored in the memory block for the at least one computer component and assign the second lifecycle classification to the at least one computer component when a predefined time period is reached, wherein the lifecycle model includes at least one predefined time period associated with a domain and a lifecycle classification such that, when the predefined time period passes for a computer component having said domain and said lifecycle classification, the lifecycle model causes said lifecycle classification for the computer component to be updated.

19. A non-transitory computer readable medium in accordance with claim 15, wherein the computer-executable instructions cause the CM computing device to organize the plurality of computer components by component attribute, including causing the CM computing device to calculate a sum of computer components assigned to each lifecycle classification, and to cause an interactive dashboard to be displayed on a stakeholder computing device including the calculated sum of computer components assigned to each lifecycle classification.

20. A non-transitory computer readable medium in accordance with claim 15, wherein the computer-executable instructions cause the CM computing device to:
  determine an operational health indicator for a domain, further causing the CM computing device to determine a percentage of the plurality of computer components for the domain that are assigned to a preferred lifecycle classification and a supported lifecycle classification; and
  cause a stakeholder computing device to display an interactive dashboard including the operational health indicator for the domain.

* * * * *